United States Patent [19]
Hutto, Jr.

[11] 4,087,362
[45] May 2, 1978

[54] FILTER HOUSING
[75] Inventor: Francis Baird Hutto, Jr., Sedalia, Colo.
[73] Assignee: Johns-Manville Corporation, Denver, Colo.
[21] Appl. No.: 663,952
[22] Filed: Mar. 4, 1976

Related U.S. Application Data
[63] Continuation-in-part of Ser. No. 642,647, Dec. 19, 1975, abandoned.
[51] Int. Cl.² .............................................. B01D 31/00
[52] U.S. Cl. .................................... 210/249; 210/344; 210/433 M
[58] Field of Search ............... 210/343, 345, 344, 249, 210/433 M

[56] References Cited
U.S. PATENT DOCUMENTS

| 2,077,999 | 4/1937 | Hurn | 210/344 X |
| 2,457,449 | 12/1948 | Davis et al. | 210/345 |
| 3,294,241 | 12/1966 | Skard et al. | 210/343 X |
| 3,343,681 | 9/1967 | Madden | 210/343 |
| 3,397,785 | 8/1968 | Jarvis et al. | 210/343 X |

Primary Examiner—Frank A. Spear, Jr.
Attorney, Agent, or Firm—Robert M. Krone; Joseph J. Kelly; James W. McClain

[57] ABSTRACT

A filter housing is disclosed. It is preferably used to house membrane filters supported on plates. The base, top and a two-way cap cooperate to form a pressure-tight vessel. The top can be moved vertically to permit use of various numbers of filters and support plates in the housing without requiring spacers or spacer tubes. The structure of the housing is such that all surfaces exposed to liquid are free of screw threads or other surface configurations which are not readily sanitizable or sterilizable, particularly by autoclaving. Also, since the tightening mechanism is outside the filter enclosure, the filters can be sterilized by autoclaving and subsequently tightened into position.

8 Claims, 4 Drawing Figures

FILTER HOUSING

CROSS-REFERENCE TO RELATED APPLICATION

This application is a continuation-in-part of applicaton Ser. No. 642,647, filed Dec. 19, 1975, now abandoned.

BACKGROUND OF THE INVENTION

The invention herein relates to housings for filters. It is of particular pertinence to housings for the filters and associated support plates used in membrane filtration.

Membrane filtration using microporous filters finds many applications in medical research, beverage production and the drug, electronics and chemical industries. This type of filtration utilizes membrane filters generally in the form of flat sheets containing many microscopic but highly uniform flow passages, generally of the order of several micrometers or less. Such filters are normally supported on rigid plates (sometimes referred to herein as "support plates"). The configuration of the support plates is such that when one is stacked upon another the impure fluid can flow between the support plates and across and through the microporous filters. The liquid filtrate discharged from the filter drains out through the other side of the support plates and is collected or discharged as desired. Typical operation of the plates and filters will be described below in more detail.

Because of the small size of the passages in the filter, much of the filtration using membrane filters is conducted under pressure. Consequently, it is necessary to place the plates and filters in a pressure vessel. In the past there have been various designs of pressure vessels, but most have been designed for a single specific configuration and number of plates. Housings have been of a fixed size, and lesser numbers of plates have been accommodated only by using spacer tubes to substitute for the "missing" plates. It has therefore not been possible to use a single housing with different numbers of stack plates without the use of spacers. However, use of spacers causes an undesirable increase in the amount of "dead" volume in the housing. Typical of such fixed size housings is that illustrated in U.S. Pat. No. 3,343,681.

Previous multiple plate devices have been constructed such that the support plates and filters had to be secured in position prior to closing up the devices. These filters, being thus under stress, could not be consistently sterilized by autoclaving because they would often rupture during the heating/cooling cycle. Consequently, the high degree of sterilization needed for many uses could not be consistently attained.

OBJECTS OF THE INVENTION

It is therefore an object of the present invention to provide a pressure vessel or housing for membrane filtration which is pressure tight and whose internal size can be adjusted to accomodate different numbers of plates and filters.

It is also an object of this invention to provide a housing which has little dead volume when in use.

It is further an object of this invention to provide a highly sanitary housing for use in membrane filtration.

It is further an object of this invention to provide a housing which can be easily loaded and unloaded.

It is also an object of this invention to provide a housing which permits the filters themselves to be sterilized simultaneously with the housing.

BRIEF SUMMARY OF THE INVENTION

The invention herein comprises a filter housing comprising (a) a base having therein a non-centrally located access port and a centrally located access port; (b) a cover having a top with a central aperture, an underside and at least one side extending downwardly from the top, the cover being dimensioned relative to the base such that the inner surface of the side of the cover abuts the face of the peripheral edge of the base; (c) an upwardly extending core member seated in the centrally located access port in the base and extending upwardly through the central aperture in the cover, the core member being divided by an internal transverse barrier into an upper and a lower hollow chamber, each chamber opening respectively at an axial end of the core member and having no communication with the other chamber and the upper chamber also having no communication with the interior of the housing, with at least a portion of the inner side of the upper chamber of the core member being threaded to receive a correspondingly threaded screw, with the core member also containing aperture means extending below the level of the upper surface of the base and permitting fluid communication between the interior of the housing and the interior of the lower chamber of the core member, which lower chamber also communicates with the centrally located access port; (d) central sealing means encircling the core member; (e) peripheral sealing means to prevent liquid inside the housing from passing out of the housing between the base and the cover; (f) cover sealing means to prevent fluid flow outwardly of said housing through the central aperture in the cover; and (g) a reversible screw assembly attached to the cover and cooperating with the threaded portion of the upper chamber of the core member, such that as the screw assembly traverses vertically in cooperation with the core member, the cover simultaneously moves vertically and cooperates with the peripheral sealing means to maintain a fluid-tight housing of variable height to accommodate differing numbers of plates in the interior of the housing; whereby when a set of support plates and associated filters are enclosed in the housing the elements (a) through (g) cooperate with each other and the plates to define a fluid flow path between the two access ports directed first radially outwardly from one access port to the periphery of the base and then radially inwardly to the other access port, with that portion of the flow path between the centrally located access port and the periphery of the base also passing through the filters.

In a preferred embodiment the non-centrally located access port serves as an inlet port for fluid flow, and the centrally located access port is an outlet port. In one configuration both the base and the cover are generally circular in shape. In still another embodiment the housing has legs extending downwardly from the underside of the base, such that the entire housing can be placed on a table, laboratory bench, or the like. Although this housing will find its primary utility in membrane filtration, it is also contemplated that it can be used for prefiltration with diatomite or similar materials or for serial filtration.

BRIEF DESCRIPTION OF THE DRAWINGS

FIG. 4 is a cross-sectional elevation view of one of the bleed valves of the housing.

DETAILED DESCRIPTION AND PREFERRED EMBODIMENTS

The various aspects of this invention will be best understood by reference to the drawings.

The housing (generally designated 2) comprises a base 4 and a cover 6. For brevity herein the housing 2 will be described in the preferred configuration of generally circular. However, it will be readily understood that the housing 2 can be square, rectangular, oval, or of other suitable shape.

Figure 1:
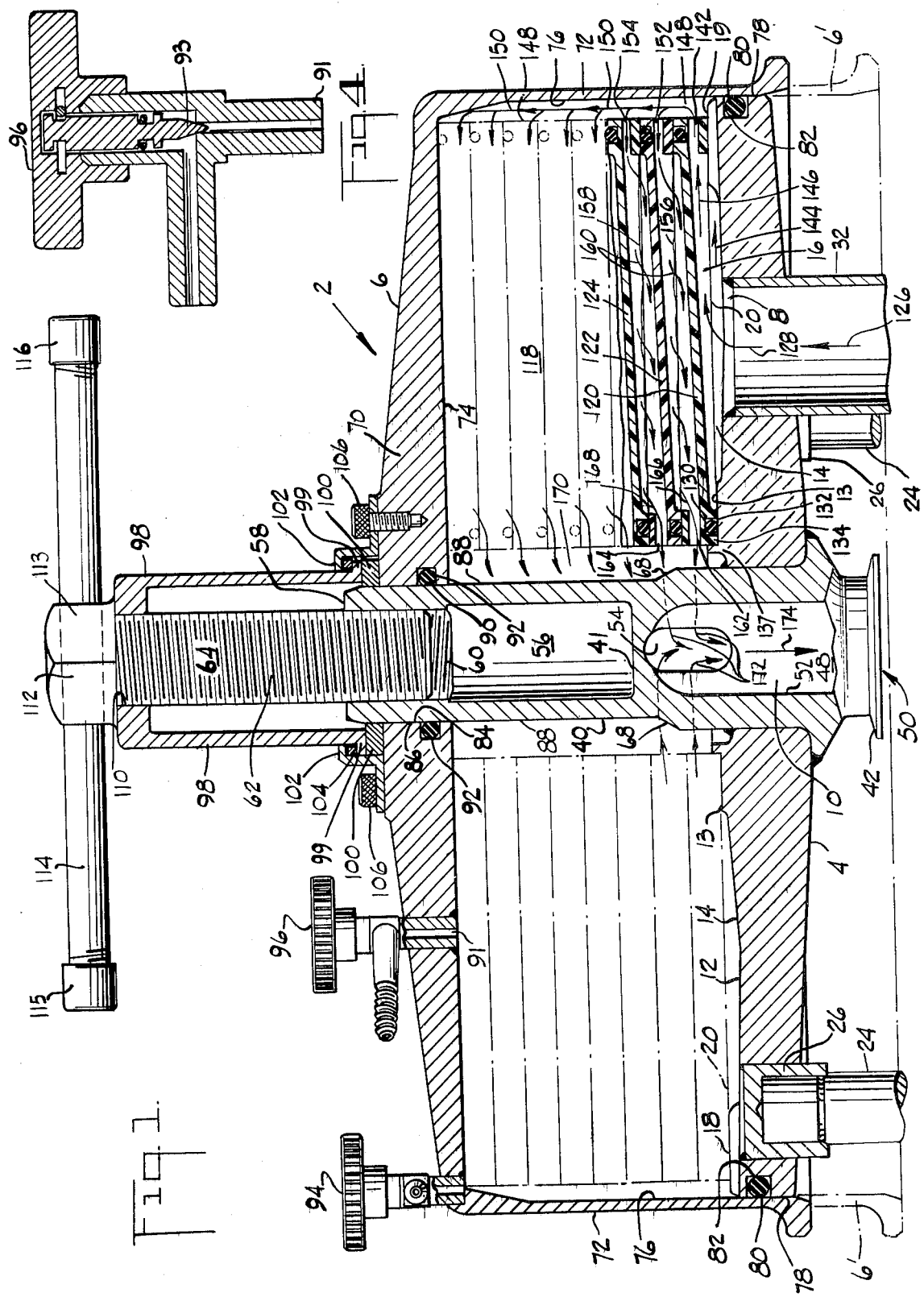
FIG. 1 is a cross-sectional elevation view taken through the entire structure in assembled configuration, and showing generally the preferred flow path of the liquid to be filtered.
Figure 3:
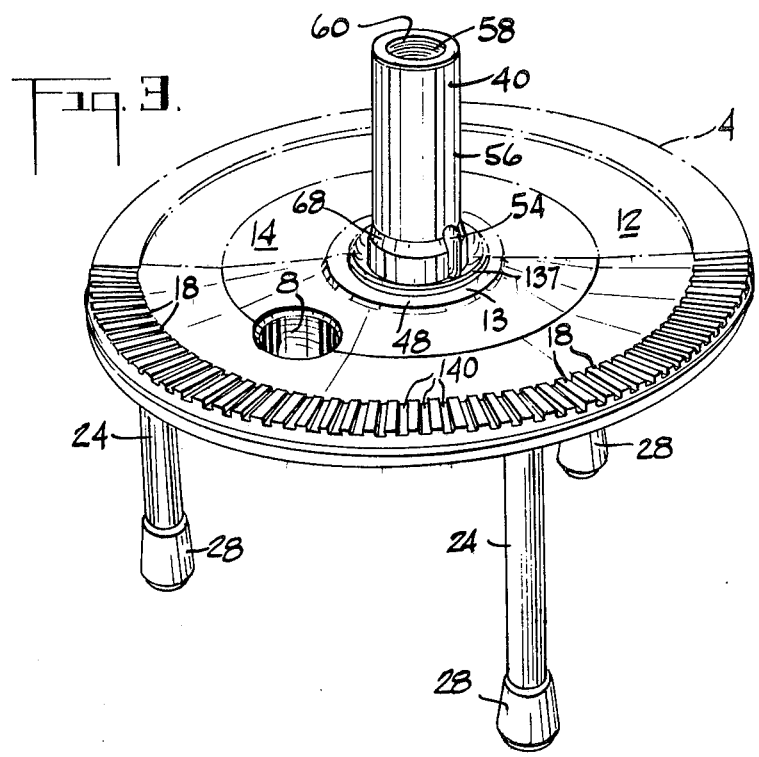
FIG. 3 is a perspective view of the base of the device.

The base 4 has two major openings therethrough, a non-centrally located port 8 intermediate the center and the peripheral edge of the base, and a centrally located port 10. (For brevity, non-centrally located port 8 will be hereinafter referred to as the "inlet" port and centrally located port 10 will be referred to as the "outlet" port, reflecting the preferred flow path to be discussed below. As will be noted, however, the flow path may be reversed if desired.) The upper surface 12 of the base 4 is relatively level and planar, although it does contain in an preferred embodiment an annular shallow depression 14. This depression allows for collection of residual filterable product. Preferably, the inlet port 8 is at the lowest point of the depression 14 to facilitate drainage of the housing during flushing and/or cleaning. Since the undersides of plates are normally channeled, as shown at 16, the upper surface of the base may be entirely flat. However, in the preferred embodiment shown, upstanding ribs 18 are incorporated into the outer portions of the base in order to provide a level surface for the botton 20 of the lowest plate. Although the diameter of the housing is normally chosen for use with support plates and filters of only slightly lesser diameter, so as to minimize dead volume, it is within the scope of this invention to extend the ribs 18 radially inwardly so that smaller diameter plates and filters can be accommodated. Level portion 13 of surface 12 may also extend outwardly farther from the center than is shown in FIGS. 1 and 3 to provide additional support to the plates.

In order to provide sufficient rigidity to the base and yet minimize weight, it is preferred to give the base a ribbed underside (not shown). In one embodiment the base also has downwardly extending legs 24 which are mounted in sockets 26 set into base 4. For convenience these legs will be tipped by feet 28, usually made of rubber, thus permitting the entire unit to be set on a laboratory bench or similar surface 30.

Fitted into the inlet port 8 in base 4 is a tubular member 32 terminating in a flange 34. The flange 34 contains provision for attachment of external fittings such as flanged elbow 36 to which in turn can be attached fluid conduit connections such as those for hose 38 (shown in phantom). The connections to outlet port 10 are similar.

The external end of core member 40 contains flange 42 to which flanged elbow 44 can be attached in a conventional manner. Hose 46 (shown in phantom) can serve as an exterior fluid drain. In the preferred embodiment shown, the tubular member 32 is longer than the outlet extension of core member 40 in order to provide additional visual differentiation between the inlet and outlet sides of the device.

Mounted in the central aperture of the base which forms outlet port 10 is core member 40. This member is normally generally cylindrical and essentially hollow. It is divided by a transverse barrier 41 into lower chamber 48 and upper chamber 56. The two chambers have no communication with each other, so no liquid can enter upper chamber 56 to contact the screw threads therein. The lower chamber 48 of the core member is open at its mouth 50 for drainage. Communication through the wall 52 of the core member to link lower chamber 48 with the interior of the housing is through aperture 54. Although only a single aperture 54 is shown it will be understood that there may be a plurality of such apertures radially around the circumference of the lower chamber 48 of the core member 40. The upper chamber 56 of core member 40 is also hollow and open at its upper end 58. The internal surface of the upper end of upper chamber 56 is threaded as indicated at 60. The internal threading 60 corresponds to the external threads 62 on screw 64. While the entire inner surface of upper chamber 56 could be threaded if desired, it has been found quite satisfactory to thread only the upper section. While core member 40 is designated as generally cylindrical overall, it will be understood that there can be slight deviations from an exact cylindrical configuration, as the slight expansion indicated for lower chamber 48 and the appearance of shoulders 68.

The cover 6 has the general configuration of an inverted bowl. The horizontal cross-section of the cover will show the same shape as the horizontal cross-section of the base 4 so that an effective seal will be obtained. The cover 6 comprises top 70 and side 72 extending downwardly from the outer peripheral edge of top 70. (Since the housing 2 illustrated in preferred form is circular, there is only one "side" 72 and related features of the top 6 and/or base 4. However, if a square or other polygonal embodiment is used, there will of course be a corresponding number of "sides" 72 and related features.) The top 70 has a underside 74 which is the bearing surface by which the pressure is applied to hold the plates in the required operative position (as best illustrated in FIG. 1).

The inside surface 76 of side 72 is machined smooth and adapted to move vertically in cooperation with the outer peripheral face 78 of base 4 and the sealing device 80 (preferably an O-ring) seated in groove 82 in face 78. The vertical length of the machined surface 76 will determine the range of number of plates and filters which can be accommodated in the housing. In the configuration shown two to eight plates (one to seven filters) can be accommodated with a full incremental range. If a deeper cover 6 is used more plates could be accommodated, but if only the same lower length of surface 76 is machined, the same incremental range would be obtained. (For instance, if the cover 6 were twice as deep, 16 plates could be accommodated. However, the incremental range would still be seven, so the housing capacity would be defined as "9 to 16" rather than "2 to 8". On the other hand, if essentially all of surface 76 were machined in the deeper housing, the capacity would be "2 to 16", since the cover 6 could be lowered farther without breaking the contact of the machined surface 76 with the sealing device 80.)

Top 70 of cover 6 is centrally pierced by aperture 84 through which projects the upper portion of core member 40. This aperture (which is generally circular) has an interior face 86 which moves vertically along the outer surface 88 of core member 40. Sealing means 90 (again preferably an O-ring) is seated in groove 92 in face 86 and prevents flow of fluid upwardly through aperture 84. Thus the motion of screw 64 permits cover 6 to move vertically to assume different positions depending on the number of plates which are present; this vertical movement is indicated by the phantom lines at 6'.

The smooth, flat undersurface 74 of top 70 exerts substantially uniform downward pressure across its entire surface, thus permitting the user of the device to use plates of differing diameters and thicknesses.

Top 70 of cover 6 is pierced by two bleed or relief valves 94 and 96. Both valves are used primarily to bleed trapped air from the interior of the housing when the unit is being pressurized with fluid prior to a filtration run. Valve 94 bleeds air from the inlet side of the stack plates and valve 96 bleeds air form the outlet side of the stack plates during testing of the unit. Both valves are constructed such that the passage 91 inwardly of the needle 93 is smooth and free of obstructions, as shown in FIG. 4.

Screw 64 serves to provide reversible vertical motion to top 6 by its linkage to cap 98, to which it is fixedly attached at surface 110. Thus, when screw 64 turns, so does cap 98. Cap 98 has a base flange 99 which rests and rotates on anti-galling washer 100 (which may be made of brass or, preferably, Teflon plastic). Cap 98 and top 6 are held together by clamp 102, thrust washer 104 and bolts 106. The top of cap 98 is formed into a hex nut 112 which is penetrated by an aperture 113. Rod 114 can be inserted through aperture 113 to provide a handle for leverage in turning screw 62 and nut 98. Rod 114 can be capped by caps 115 and 116 (preferably socket head cap screws) if desired to prevent it from coming out of aperture 113. Cap 98 and screw 64 can thus be rotated by use of either rod handle 114 or by use of a wrench directly on hex nut 112.

In actual operation rotation of screw 64 and cap 98 clockwise (with right hand threads) drives top 6 downward by the force of flange 99 bearing on washer 100. Such motion can continue until the desired pressure-tight seal has been obtained. In tests a torque of 20 foot-pounds has been found quite adequate to effect a seal capable of holding an internal pressure of 250 psig. When turned counterclockwise, screw 64 and cap 98 move top 6 upward by bearing against thrust washer 104 and clamp 102. It should be noted that the "gear puller" action of screw 64 and cap 98 is necessary to overcome the sealing friction of the various O-ring seals. Preferably, screw 64 and core member 40 are made of different metals (normally different stainless steel alloys) to prevent galling between the threads 62 of screw 64 and the internal threading 60 of upper section 56 of the core member 40.

FIG. 1 illustrates schematically the preferred operation of the filtration system using the housing of the present invention. The desired number of plates are assembled in a vertical array centered by lip 137 and corresponding aligning means (not shown) on each successive plate. The housing will contain a minimum of two plates (with one filter between them) if the inside surface 76 of the cover 6 is machined smooth and vertical to within two plate widths of the underside 74 of top 70, as shown in FIG. 1. Machining a lesser distance from the bottom of surface 76 will increase the minimum number of plates because the underside 74 of cover 6 will not be able to be brought as close to the base and still have side 72 maintain good sealing contact at the peripheral edge 78 of base 4, as discussed above.

The maximum number of plates which the housing can contain will be dependent on the depth of cover 6 and the height of core member 40. The configuration shown, with a maximum of eight plates and seven filters, has been found to be quite satisfactory. Greater numbers of plates will of course require deeper covers and taller core members than those shown, and may also require alteration in the hydraulic properties, such as enlargement of aperture 54 and/or the diameter of lower chamber 48.

Figure 2:
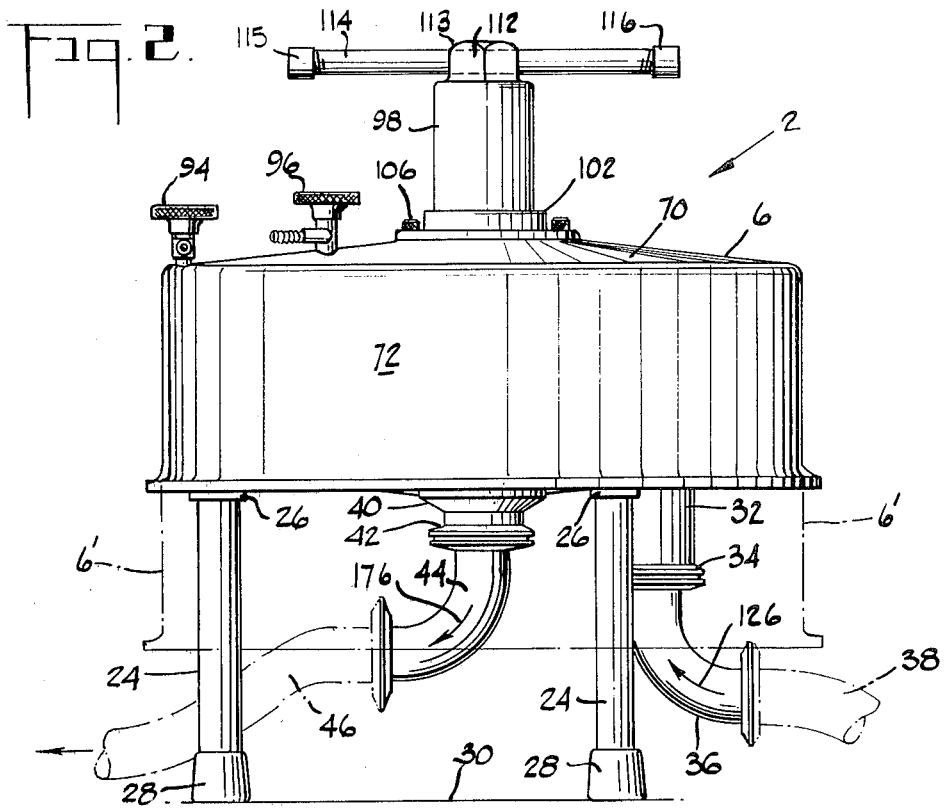
FIG. 2 is an elevation view showing the external appearance of one embodiment of the housing and indicating with phantom lines the adjustable height of the device.

FIG. 1 shows a small portion in cross-section of three of these plates, designated respectively 120, 122 and 124. Impure fluid enters through inlet sleeve 32 and inlet port 8, as indicated by arrows 126 and 128, and is diverted radially outwardly. Flow inwardly is prevented by the seal formed by O-ring 130 in groove 132 in the underside of the inner portion 134 of bottom plate 120, making sealing contact with annular raised portion 13 of base 12. Upstanding annular lip 137 acts to center the circular plates in the housing. The fluid flows out through grooves 140 (FIG. 3) between adjacent ribs 18 and also through peripheral ports 142 in plate 120, as indicated by arrows 144 and 146. The fluid then flows upward through peripheral channel 148 as indicated by arrows 150 and then inwardly through peripheral ports 152 in plate 122 and 154 in plate 124. The impure fluid then flows across the filters 156 and 158 which are held between, respectively, plates 120 and 122, and 122 and 124. Liquid passes through the filters, leaving the solid residue on the filter, and the clear filtrate passes inwardly across the top of the plate below, as indicated by arrows 160. Finally the filtrate passes through exit ports 162 and 164 between the plates (arrows 166 and 168) and into central space 170, thence through aperture 54 (arrows 172) into lower chamber 48 of core member 40 and outward through outlet port 10 (arrow 174) and drain lines 44 and 46 (arrow 176; FIG. 2).

If desired, the flow path just described may be reversed, by using support plates and filters adapted for radially outwardly filtration flow rather than the radially inwardly flow illustrated. Since the latter type of plates and filters are conventional and much more common, however, the flow path described above is preferred.

The housing will normally be made of readily cleanable metal, particularly stainless steel alloys, with different alloys of steel or brass and/or plastics where galling or binding is a potential problem, as with the aforementioned screw 64 and core member 40. O-rings should be of heat resistant material so that the entire assembly can be sterilized by autoclaving.

One of the advantageous features of this device not found in the prior art devices in the small "dead" (volume. This is the volume particularly in annuli 148 and 170) which does not participate in the filtration function but which must be filled with liquid in order to establish operating pressures. Obviously, where expensive and/or low volume fluids are to be filtered (as for instance drug cultures), it is very costly and inefficient to have a large amount of "dead" volume which must be filled but which does not directly aid in the filtration.

Another advantageous feature of this housing is that it permits sterilization of the membrane filters themselves, which has heretofore not been possible with many conventional filter housings. In a typical prior art housing, the support plates and filters are stacked atop the base of the housing and then clamped down to provide the necessary sealing pressures. Thereafter the clamped plates and filters are covered and the entire device sealed. Attempts in the past to autoclave the devices after sealing have been prone to failure, for the heating and cooling of the rigidly clamped filters has caused them to tear. On the other hand, it has not been possible to sterilize the filters in an unclamped or loosely clamped arrangement, for that would require reopening the housing to tighten the internal clamps and would thus destroy the interior sterilization. Consequently, it has been considered that membrane filters cannot be autoclave sterilized in the multiple support plate housings. The present device, however, has its tightening means external of the plate cavity, in the form of cap 98 and nut 112. This permits the top 6 to be placed over the plates and filters in a tight sealing configuration but with little pressure on the plates and filters. The entire device and its plates and filters can then be autoclaved for sterilization. Following autoclaving and cooling the desired sealing pressure can be applied by use of cap 98 and mut 112 without reopening the housing and thus violating the sterile conditions of plates, filters and housing interiors.

What I claim is:

1. A housing for at least one membrane filter and its associated support plates which comprises:
    (a) a base having therein a non-centrally located access port and a centrally located access port;
    (b) a cover having a top with a central aperture, an underside and at least one side extending downwardly from said top, said cover being dimensioned relative to said base such that the inner surface of said side abuts the face of the peripheral edge of said base;
    (c) an upwardly extending hollow core member seated in said centrally located access port in said base, and extending upward through said central aperture in said cover, the core member being divided by an internal transverse barrier into an upper and a lower hollow chamber, each opening respectively at an axial end of the core member having no communication with the other, and the upper chamber also having no communication with the interior of the housing, with at least a portion of the inner side of the upper chamber of said core member being threaded to receive a correspondingly threaded screw, with said core member also containing aperture means extending below the level of the upper surface of the base and permitting fluid communication between the interior of said housing and the interior of said lower chamber of said core member, which lower chamber also communicates with said centrally located access port;
    (d) central sealing means encircling said core member;
    (e) peripheral sealing means to prevent liquid inside said housing from passing out of said housing between said base and said base and said cover;
    (f) cover sealing means to prevent fluid flow outwardly of said housing through said central aperture in said cover; and
    (g) a reversible screw assembly attached to said cover and cooperating with the threaded portion of said upper chamber of said core member, such that as said screw assembly traverses vertically in cooperation with said core member, said cover simultaneously moves vertically and cooperates with said peripheral sealing means to maintain a fluid-tight housing of variable height to accommodate differing numbers of filters and associated support plates in the interior of said housing; whereby when a set of support plates and associated filters are enclosed in the housing the elements (a) through (g) cooperate with each other and the plates to define a fluid flow path between the two access ports directed first radially outwardly from one access port to the periphery of the base and then radially inwardly to the other access port, with that portion of the flow path between said centrally located access port and said periphery of said base also passing through said filters.

2. The housing of claim 1 wherein said cover also contains at least one bleed valve.

3. The housing of claim 1 wherein said base and said cover are generally circular in shape.

4. The housing of claim 1 further comprising legs extending vertically downward from the under side of said base.

5. The housing of claim 1 wherein said screw assembly comprises an externally threaded screw; a cap fixedly attached thereto, said cap having a base flange; a clamp holding said cap in cooperating relationship with said cover; and means for rotating said screw and cap; such that as said screw and cap rotate and move vertically said cover also moves vertically.

6. The housing of claim 1 wherein said central sealing means comprises a sealing device located in the underside of the bottom support plate and cooperating with a raised annular portion of said base.

7. The housing of claim 1 wherein said peripheral sealing means comprises a sealing device in the face of the peripheral edge of said base cooperating with the inner surface of said side of said cover.

8. The housing of claim 1 wherein said cover sealing means comprises a sealing device in the inner face of said central aperture which cooperates with the outer surface of said core member.

* * * * *